United States Patent
Wang et al.

(10) Patent No.: US 12,393,864 B2
(45) Date of Patent: Aug. 19, 2025

(54) REINFORCEMENT LEARNING WITH QUANTUM ORACLE

(71) Applicant: Microsoft Technology Licensing, LLC, Redmond, WA (US)

(72) Inventors: Daochen Wang, College Park, MD (US); Aarthi Meenakshi Sundaram, Seattle, WA (US); Robin Ashok Kothari, Seattle, WA (US); Martin Henri Roetteler, Woodinville, WA (US); Ashish Kapoor, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1118 days.

(21) Appl. No.: 17/160,309

(22) Filed: Jan. 27, 2021

(65) Prior Publication Data
US 2022/0253743 A1 Aug. 11, 2022

(51) Int. Cl.
*G06N 10/00* (2022.01)
*G06N 7/01* (2023.01)
*G06N 20/00* (2019.01)

(52) U.S. Cl.
CPC ............ *G06N 20/00* (2019.01); *G06N 7/01* (2023.01); *G06N 10/00* (2019.01)

(58) Field of Classification Search
CPC ........... G06N 20/00; G06N 10/00; G06N 7/01
See application file for complete search history.

(56) References Cited

U.S. PATENT DOCUMENTS

2020/0349453 A1 11/2020 Ronagh

OTHER PUBLICATIONS

Dunjko et al., Exponential Improvements for Quantum-Accessible Reinforcement Learning, Aug. 2018. (Year: 2018).*
Dunjko et al., Quantum-Enhanced Machine Learning, Oct. 2016. (Year: 2016).*
Sidford et al., Near-Optimal Time and Sample Complexities for Solving Discounted Markov Decision Process with a Generative Model, Jun. 2019. (Year: 2019).*
"International Search Report and Written Opinion Issued in PCT Application No. PCT/US21/064485", Mailed Date: Apr. 12, 2022, 14 Pages.

(Continued)

*Primary Examiner* — Marshall L Werner
(74) *Attorney, Agent, or Firm* — Alleman Hall & Tuttle LLP

(57) ABSTRACT

A computing device is provided, including a processor configured to transmit, to a quantum coprocessor, instructions to encode a Markov decision process (MDP) model as a quantum oracle. The processor may be further configured to train a reinforcement learning model at least in part by transmitting a plurality of superposition queries to the quantum oracle encoded at the quantum coprocessor. Training the reinforcement learning model may further include receiving, from the quantum coprocessor, one or more measurement results in response to the plurality of superposition queries. Training the reinforcement learning model may further include updating a policy function of the reinforcement learning model based at least in part on the one or more measurement results.

19 Claims, 11 Drawing Sheets

(56) References Cited

OTHER PUBLICATIONS

Sidford, et al., "Near-Optimal Time and Sample Complexities for Solving Discounted Markov Decision Process with a Generative Model", In Repository of arXiv:1806.01492v3, Jun. 5, 2019, pp. 1-31.
Wang, et al., "Quantum Algorithms for Reinforcement Learning with a Generative Model", In Repository of arXiv:2112.08451v1, Dec. 15, 2021, pp. 1-26.
Wang, et al., "Quantum Algorithms for Reinforcement Learning with a Generative Model", Retrieved From: https://wdaochen.com/slides/quantumrl_qtml_nopause.pdf, Nov. 8, 2021, 12 pages.
Agarwal, et al., "Reinforcement Learning: Theory and Algorithms", Retrieved from: https://rltheorybook.github.io/rltheorybook_AJKS.pdf, Dec. 9, 2020, 172 Pages.
Ambainis, et al., "Quantum Speedups for Exponential-Time Dynamic Programming Algorithms", In the Repository of arXiv:1807.05209v1, Jul. 13, 2018, 17 Pages.
Azar, et al., "On the Sample Complexity of Reinforcement Learning with a Generative Model", In Proceedings of 29th International Conference on Machine Learning, Jun. 27, 2012, 8 Pages.
Bertsekas, Dimitri P., "Abstract Dynamic Programming", In Thesis of Massachusetts Institute of Technology, Jan. 2013, 14 Pages.
Brassard, et al., "Quantum Amplitude Amplication and Estimation", In Contemporary Mathematics, vol. 305, May 2, 2000, 32 Pages.
Childs, et al., "Exponential Algorithmic Speedup by a Quantum Walk", In Proceedings of the Thirty-Fifth Annual ACM Symposium on Theory of Computing, Jun. 9, 2003, pp. 59-68.
Cornelissen, A.J., "Quantum Gradient Estimation and its Application to Quantum Reinforcement Learning", In Master Thesis Submitted to Delft University of Technology, Aug. 21, 2018, 178 Pages.
Durr, et al., "A Quantum Algorithm for Finding the Minimum", In the Repository of arXiv.quant-ph/9607014v1, Jul. 18, 1996, 2 Pages.
Kearns, et al., "Finite-Sample Convergence Rates for Q-Learning and Indirect Algorithms", In Proceedings of Advances in Neural Information Processing Systems, Nov. 1999, pp. 996-1002.
Montanaro, Ashley, "Quantum Speedup of Monte Carlo Methods", In the Proceedings of the Royal Society A: Mathematical, Physical and Engineering Sciences, Sep. 8, 2015, 20 Pages.
Ronagh, Pooya, "Quantum Algorithms for Solving Dynamic Programming Problems", In the Repository of arXiv:1906.02229v2, Oct. 18, 2019, 25 Pages.
Sidford, et al., "Near-Optimal Time and Sample Complexities for Solving Markov Decision Processes with a Generative Model", In Proceedings of the 32nd International Conference on Neural Information Processing Systems, Dec. 3, 2018, 11 Pages.
Sidford, et al., "Variance Reduced Value Iteration and Faster Algorithms for Solving Markov Decision Processes", In Proceedings of the Twenty-Ninth Annual ACM-SIAM Symposium on Discrete Algorithms, Jan. 2018, pp. 770-787.
Azar, et al., "Minimax PAC Bounds on the Sample Complexity of Reinforcement Learning with a Generative Model", In Journal of Machine Learning, vol. 91, Issue 3, May 14, 2013, pp. 325-349.

* cited by examiner

EXAMPLE MARKOV DECISION PROCESS MODEL

Algorithm 1: qApxTrans$(u, M, s, a, \epsilon, \delta)$

Input: $u \in \mathbb{R}^S$, with $\|u\|_\infty \leq M$, stored in QRAM; $s \in \mathcal{S}, a \in \mathcal{A}$; target accuracy $\epsilon \in (0,1)$, with $\epsilon < 4M$, and failure probability $\delta \in (0,1)$.

Output: $\hat{y} \in \mathbb{R}$

1. Use $\mathcal{O}$ and QRAM storing $u$ to form oracle $O_{s,a}$ that maps $$|0\rangle|0\rangle \mapsto \sum_{s'} \sqrt{p(s'|s,a)} |u(s')\rangle |\psi_{s'}\rangle$$

2. Apply Montanaro's algorithm (Theorem 2), with $M$, $\epsilon$ and $\delta$ on $O_{s,a}$ to output an estimate $\hat{y}$ of $y := \mathbb{E}_{s' \sim p(\cdot|s,a)}[u(s')] = p(\cdot|s,a)^T u$.

Algorithm 2: qSampledRandomizedMonVI($v_0, \pi_0, L, \epsilon, \delta$)

Input: $v_0 \in \mathbb{R}^S$ stored in QRAM, $\pi_0 \in A^S$ with $T_{\pi_0}(v_0) \geq v_0$; number of iterations $L > 0$; target accuracy $\epsilon \in (0,1)$, and failure probability $\delta \in (0,1)$.

Output: $v_L \in \mathbb{R}^S, \pi_L \in A^S$

1  for each round $l \in [L]$ do
2      for each state $s \in S$ do
3          Use $O$, QRAM storing rewards, and QRAM storing $v_0$ and $v_{l-1}$ to form oracle $O_1^a$ that maps $$|a\rangle|0\rangle|0\rangle|0\rangle|0\rangle \mapsto |a\rangle|r(s,a)\rangle \sum_{s'} \sqrt{p(s'|s,a)}|v_0(s')\rangle|v_{l-1}(s') - v_0(s')\rangle|\psi\rangle$$

4          Apply Montanaro's algorithm (Theorem 2) twice, with $M = \|v_0\|_\infty$ first and $M = \|v_{l-1} - v_0\|_\infty$ second, $\epsilon = \epsilon/2$, and $\delta = \delta/(LSA)$, on $O_1^a$ to form an oracle $O_2^a$ that maps $$|a\rangle|0\rangle|0\rangle|0\rangle \mapsto |a\rangle|\psi_{s,a}'\rangle|r(s,a)\rangle|\tilde{x}(s,a)\rangle|\tilde{y}(s,a)\rangle$$

up to error $O(\delta/LSA)$ for some states $|\psi_{s,a}'\rangle$, where $\tilde{x}(s,a)$ and $\tilde{y}(s,a)$ are estimates of $x(s,a) := \mathbb{E}_{s' \sim p(\cdot|s,a)}[v_0(s')]$ and $y(s,a) := \mathbb{E}_{s' \sim p(\cdot|s,a)}[v_{l-1}(s') - v_0(s')]$ within error $\epsilon/2$ respectively.

5          Without further queries, use $O_2^a$ to form an oracle $O_3$ that maps $$|a\rangle|0\rangle|0\rangle \mapsto |a\rangle|\psi_{s,a}'\rangle|\hat{Q}(s,a)\rangle$$

for some states $|\psi_{s,a}'\rangle$ and $\hat{Q}(s,a) = r(s,a) + \gamma(\tilde{x}(s,a) + \tilde{y}(s,a))$.

6          Apply quantum minimum finding (Theorem 3) on $O_3$ with respect to the third register to assign $$v(s) \leftarrow \max_a \hat{Q}(s,a)$$
$$\pi(s) \leftarrow \arg\max_a \hat{Q}(s,a)$$

7      for each state $s \in S$ do
8          if $v(s) - \gamma\epsilon > v_{l-1}(s)$ then
9              $v(s) \leftarrow v(s) - \gamma\epsilon$
10         else
11             $v(s) \leftarrow v_{l-1}(s)$
12             $\pi(s) \leftarrow \pi_{l-1}(s)$
13     $v_l \leftarrow v$
14     $\pi_l \leftarrow \pi$

FIG. 4

| $\epsilon/(1-\gamma)$-accurate | Classical sample complexity | | Quantum query complexity | |
|---|---|---|---|---|
| | Upper bound | Lower bound | Upper bound | Lower bound |
| $q^*$ | $\frac{SA}{\epsilon^2(1-\gamma)^3}$ | Matching | $SA\left(\frac{1}{\epsilon(1-\gamma)^2} + \frac{1}{(1-\gamma)^3}\right)$ | $\frac{S\sqrt{A}}{\epsilon\sqrt{1-\gamma}}$ |
| $v^*$ | $\frac{SA}{\epsilon^2(1-\gamma)^3}$ | Matching | $\frac{S\sqrt{A}}{\epsilon(1-\gamma)^{1.5}}$ | $\frac{S\sqrt{A}}{\epsilon\sqrt{1-\gamma}}$ |
| $\pi^*$ | $\frac{SA}{\epsilon^2(1-\gamma)^3}$ | Matching | $\frac{S\sqrt{A}}{\epsilon(1-\gamma)^{1.5}}$ | $\frac{S\sqrt{A}}{\epsilon\sqrt{1-\gamma}}$ |
| $v^\pi(\mu)$ | $\frac{1}{(1-\gamma)\epsilon^2}$ | Matching | $\frac{1}{(1-\gamma)^k}$ | Matching |
| $[\nabla_\theta v^{\pi_\theta}(\mu)]_k$ | $\frac{1}{(1-\gamma)^4\epsilon^2}$ | Matching | $\frac{1}{(1-\gamma)^k}$ | Matching |
| $Risk_f^\pi(s)$ | $\frac{1}{(1-\gamma)^4\epsilon^2}$ | Matching | $\frac{1}{(1-\gamma)^k}$ | Matching |

FIG. 5B

REINFORCEMENT LEARNING WITH QUANTUM ORACLE

BACKGROUND

Reinforcement learning (RL) is a subfield of machine learning that studies how an agent should interact with an environment to maximize its reward. RL may, for example, be used to train agents (so-called "AIs") to play board games or online video games with humans or other AIs. Other example applications of RL include autonomous vehicle navigation and control of industrial processes.

SUMMARY

According to one aspect of the present disclosure, a computing device is provided, including a processor configured to transmit, to a quantum coprocessor, instructions to encode a Markov decision process (MDP) model as a quantum oracle. The processor may be further configured to train a reinforcement learning model at least in part by transmitting a plurality of superposition queries to the quantum oracle encoded at the quantum coprocessor. Training the reinforcement learning model may further include receiving, from the quantum coprocessor, one or more measurement results in response to the plurality of superposition queries. Training the reinforcement learning model may further include updating a policy function of the reinforcement learning model based at least in part on the one or more measurement results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example algorithm that may be used to compute an estimated optimal Q-function, according to the embodiment of FIG. 2A or 2B.

FIG. 4 shows an example algorithm that may be used to compute an estimated optimal value function or an estimated optimal policy, according to the embodiment of FIG. 2A or 2B.

FIG. 5B shows a table summarizing the classical sample complexities and the quantum query complexities of each of the quantities shown in FIG. 5A.

DETAILED DESCRIPTION

Problems in the RL framework are often recast as Markov decision processes (MDPs) that model the environments to which RL is applied. MDPs may be used to model decision-making in scenarios where some outcomes are partly stochastic (i.e., transitions) and partly under the control of the agent (i.e., actions). The RL model may be trained using samples taken at the MDP.

An MDP may have a finite set of known states S. At each state, an action may be chosen from a finite set of actions A. Upon taking an action $a \in A$ at a state $s \in S$, the agent may receive a reward $r(s,a) \in [0,1]$ and transition to a state $s' \in S$ with a probability $p(s'|s,a)$. The number of states in S is indicated below as S, and the number of actions in A is indicated below as A.

Figure 1:
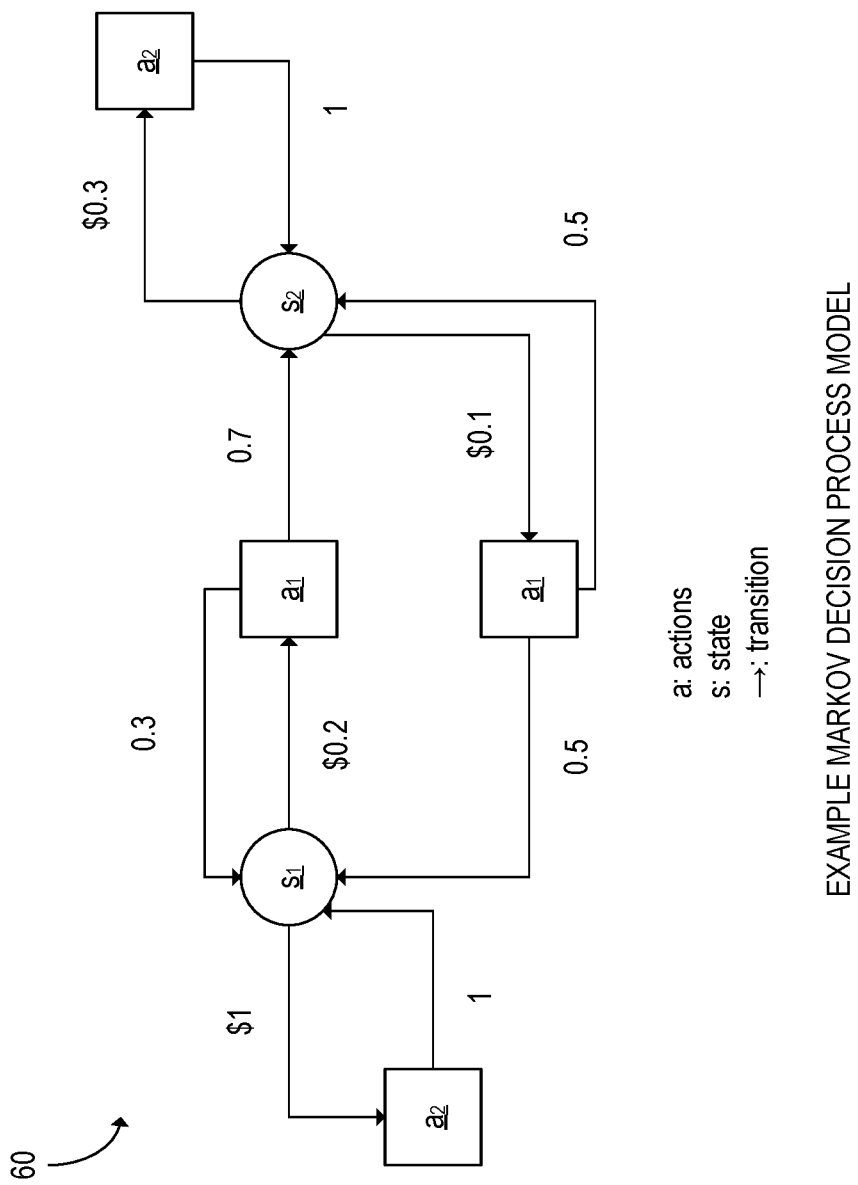
FIG. 1 schematically shows an example of a Markov decision process.

FIG. 1 shows a simplified example of an MDP 60 including a first state $s_1$ and a second state $s_2$. From each of the states of the example MDP 60, the agent may take a first action $a_1$ or a second action $a_2$. The first action $a_1$ and the second action $a_2$ each have respective rewards associated with taking them (shown in FIG. 1 as dollar amounts). In the example of FIG. 1, $r:S \times A \rightarrow [0,1]$ is deterministic and fully known. However, in other examples, the rewards r may be stochastic and/or at least partially unknown.

The MDP 60 may also have a known discount factor $\gamma \in [0,1)$. The reward received at step i may be discounted by a factor of $\gamma^i$, thus giving the agent a reward horizon of $1/(1-\gamma)$.

In addition, each action a is associated with respective probabilities that the MDP 60 will transition to the first state $s_1$ and the second state $s_2$ when that action is taken. In the example MDP 60 of FIG. 1, each probability $p(s'|s,a)$ is known. However, in other examples, the state transition probabilities p may be unknown and may be sampled as discussed below.

The MDP 60 may be fully described by a tuple $(S, A, p, r, \gamma)$ of the quantities discussed above, where p is the set of probabilities $p(s'|s,a)$ and r is the set of rewards $r(s,a)$.

The agent may have a policy $\pi:S \rightarrow A$ that indicates a respective action taken when in each state of the MDP. The policy $\pi$ may be deterministic or stochastic. In addition, the policy $\pi$ may have an associated value function $v^\pi:S \rightarrow [0,1]$ and a Q-function $q^\pi:S \times A \rightarrow [0,1]$. The value function $v^\pi$ may indicate a reward expected from a state s when following the policy $\pi$, and may be defined as follows:

$$v^\pi(s) = (1-\gamma)\mathbb{E}\left[\sum_{t=0}^{\infty} \gamma^t r(s_t, a_t) \,\middle|\, \pi, s_0 = s\right]$$

where 𝔼 indicates an expected value. The Q-function $q^\pi$ may indicate a reward expected from taking an action a when in the state s and selecting subsequent actions according to the policy π, and may be defined as follows:

$$q^\pi(s, a) = (1 - \gamma)\mathbb{E}\left[\sum_{t=0}^{\infty} \gamma^t r(s_t, a_t) \middle| \pi, s_0 = s, a_0 = a\right]$$

In the examples provided herein, the value function $v^\pi$ and the Q-function $q^\pi$ are normalized to the interval [0,1].

The process of training an RL model using the MDP, as discussed below, may be a process of estimating an optimal policy π*:→S×A that is deterministic and stationary. The optimal policy π* may be the policy such that $q^{\pi*}(s,a) \geq q^\pi$ (s,a) for all π∈Π, s∈S, and a∈A, where Π is the space of all randomized, possibly non-stationary, policies. The policies discussed below are assumed to be deterministic and stationary unless otherwise stated.

An optimal value function $v^*:=v^{\pi*}$ and an optimal Q-function $q^*:=q^{\pi*}$ may be estimated via (ε,δ) probably approximately correct (PAC) learning. The optimal value function v* and the optimal Q-function q* are uniquely specified, while the optimal policy π* may be non-unique. (ε,δ) PAC-learning may output a value function v̂ and a Q-function q̂ that are respectively within a distance ε of v* and q* with a probability of at least 1−δ. The distance may be computed in the $l_\infty$-norm. (ε,δ) PAC-learning may also be used to find a policy function π̂ that has a value $v^{\hat\pi}$ within a distance ε of v* in the $l_\infty$-norm with a probability of at least 1−δ.

In existing methods of training RL models on MDPs, the MDP may have to be sampled a large number of times to determine a policy function π̂ that is sufficiently close to the optimal policy π*. According to such methods, the number of samples of the MDP needed to determine π̂ may be proportional to $1/\varepsilon^2$. Thus, large amounts of computation may be required to determine a policy that is close to optimal. In addition, the number of samples of the MDP needed to train the RL model may increase linearly with the number of actions A of the MDP. Accordingly, training RL models on MDPs with large numbers of actions A may be slow and expensive.

Figure 2A:
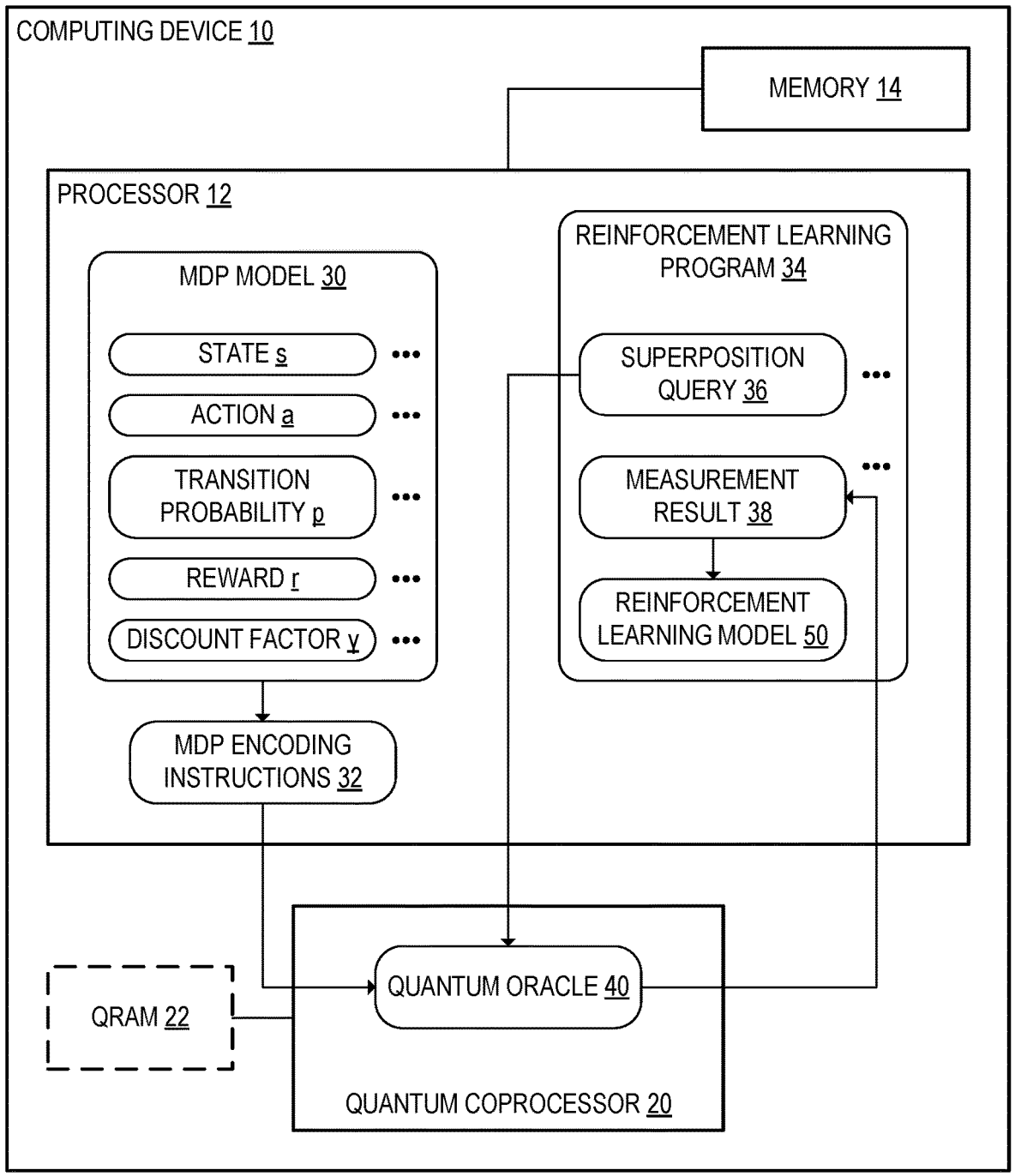
FIG. 2A schematically shows an example computing device including a quantum coprocessor and a processor configured to train a reinforcement learning model, according to one example embodiment.

Turning now to FIG. 2A, a computing device 10 is shown, according to one example embodiment of the present disclosure. The computing device 10 may include a processor 12 that is operatively coupled to memory 14 and is configured to perform classical computing operations. In addition, the processor 12 may be operatively coupled to a quantum coprocessor 20. At the quantum coprocessor 20, quantum computations may be performed at a quantum-mechanical system including a plurality of qubits that are in a superposition of basis states. The quantum coprocessor 20 may be configured to receive, from the processor 12, instructions to perform operations on the qubits that modify the state of the quantum-mechanical system. The quantum coprocessor 20 may be further configured to perform measurements of observable quantities of the quantum-mechanical system and output the results of those measurements to the processor 12. In some examples, the quantum coprocessor 20 may be operatively coupled to quantum random access memory (QRAM) 22 that is configured to store a superposition of a plurality of qubits. The quantum coprocessor 20 may be configured to perform a memory call to the QRAM 22 to retrieve stored data.

Although the components of the computing device 10 are shown in FIG. 2A as being included in one physical computing device, the processor 12, memory 14, and/or quantum coprocessor 20 may alternatively be distributed between a plurality of physical computing devices that are configured to communicate with each other. For example, the functionality of the processor 12, memory 14, and/or quantum coprocessor 20 may be distributed between a plurality of server computing devices located in a data center.

The processor 12 may be configured to receive or generate an MDP model 30. The MDP model 30 may represent a physical environment (e.g. an assembly line) or a virtual environment (e.g. a video game) as a Markov decision process. The MDP model 30 may include a plurality of states s, a plurality of actions a, a plurality of transition probabilities p, a plurality of rewards r, and a discount factor γ, as discussed above.

The processor 12 may be further configured to generate, from the MDP model 30, MDP encoding instructions 32 to encode the MDP model 30 as a quantum oracle 40. The MDP encoding instructions 32 may be a set of operations configured to be performed on the quantum state of the quantum coprocessor 20 in order to construct a quantum analogue to the classical MDP model 30. Thus, the quantum oracle 40 may be configured to apply the following mapping:

$$|s\rangle|a\rangle|0\rangle|0\rangle \rightarrow |s\rangle|a\rangle\sum_{s'} \sqrt{p(s' | s, a)} |s'\rangle|\psi_{s'}\rangle$$

where $|\psi_{s'}\rangle$ are junk states. The quantum oracle 40 is denoted below by O.

The processor 12 may be further configured to execute a reinforcement learning program 34 at which an RL model 50 may be trained. When executing the reinforcement learning program 34, the processor 12 may be further configured to a plurality of superposition queries 36 to the quantum oracle 40 encoded at the quantum coprocessor 20. Each superposition query 36 may be a request to receive a measurement result 38 from the quantum coprocessor 20.

In response to the plurality of superposition queries 36, the processor 12 may be further configured to receive, at the reinforcement learning program 34, one or more measurement results 38. For example, the one or more measurement results 38 may include an optimal value estimate for a Q-function q, a value function v, or a policy function π of the RL model 50.

The processor 12 may be further configured to train the RL model 50 by updating the policy function π based at least in part on the one or more measurement results 38. The processor 12 may, for example, be configured to train the reinforcement learning model via Q-learning or approximate value iteration. Thus, the quantum coprocessor 20 may assist the processor 12 with steps of training the RL model 50 that may be performed more efficiently at a quantum computing device than at a classical computing device.

Figure 2B:
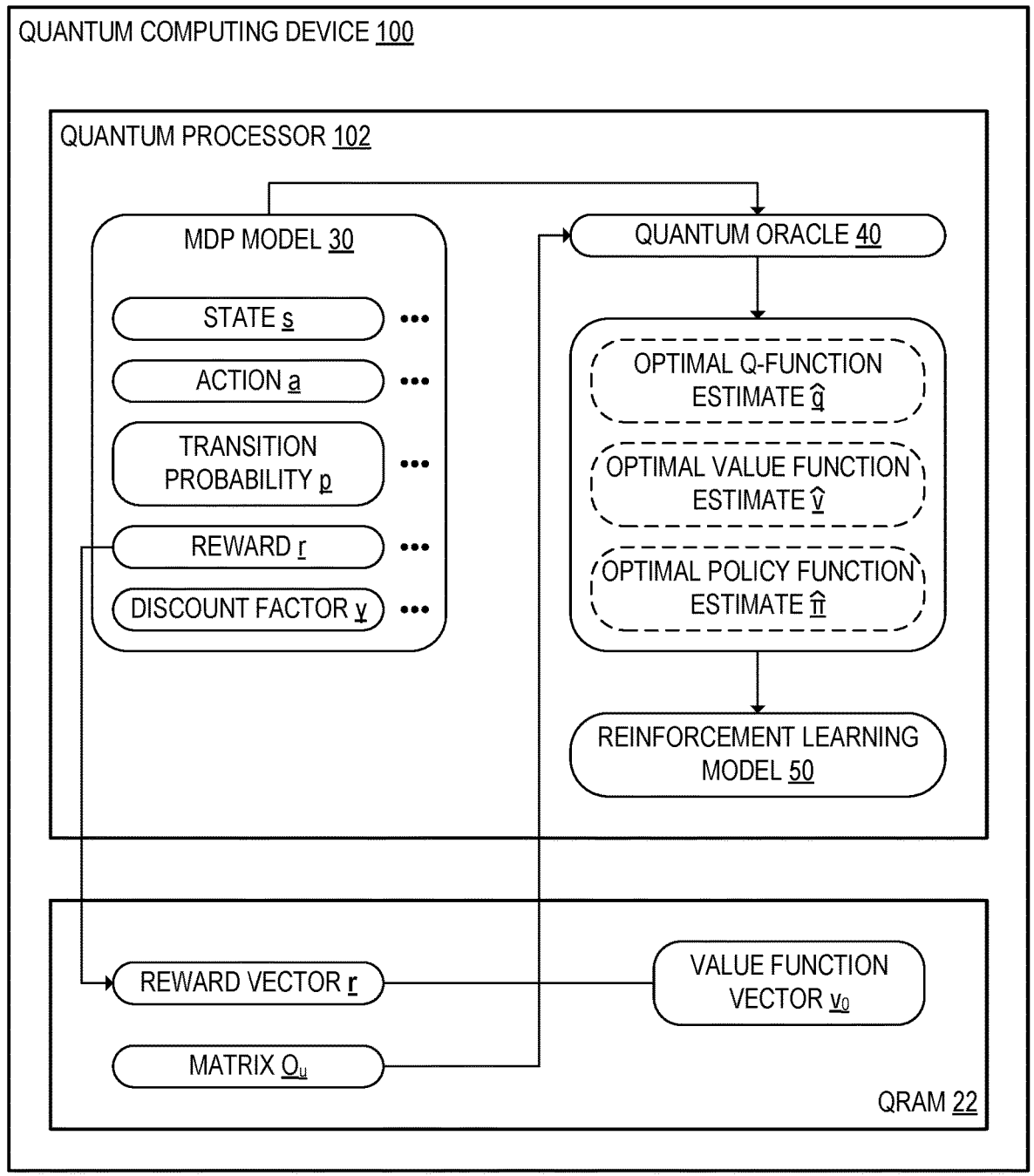
FIG. 2B schematically shows an example quantum computing device including a quantum processor configured to train a reinforcement learning model, according to another example embodiment.

As an alternative to the computing device 10 of FIG. 2A, a quantum computing device 100 may instead be used to train the reinforcement learning model 50, as shown in the example of FIG. 2B. The quantum computing device 100 shown in the example of FIG. 2B includes a quantum processor 102 and QRAM 22. In contrast to the computing device 10 of FIG. 2A, the reinforcement learning model 50 is trained at the quantum processor 102 in the example of FIG. 2B, instead of at a classical processor.

Definitions of quantities used below are now provided. For each state $s \in S$ and each action $a \in A$, $p(\cdot|s,a)$ may denote the vector in $[0,1]^S$ with entries $[p(s'|s,a)]_{s'}$. In addition, a value operator $T: \mathbb{R}^S \to \mathbb{R}^S$ and a value operator of the policy $\pi$, $T^\pi: \mathbb{E}^S \to \mathbb{E}^S$, may be defined entry-wise as follows:

$$T(u)_s := \max_a \{r(s, a) + \gamma p(\cdot | s, a)^T u(s)\}$$

$$T^\pi(u)_s := r(s, \pi(s)) + \gamma p(\cdot | s, \pi(s))^T u(s)$$

For any policy $\pi$, both $T$ and $T^\pi$ are $\gamma$-contractions on $\mathbb{E}^S$ in the $l_\infty$-norm.

For a state distribution $\mu$, the value function $v^\pi(\mu)$ may be defined as $v^\pi(\mu) := \mathbb{E}_{s \sim \mu}[v^\pi(s)]$. In addition, a value function gradient $\nabla v^{\pi\theta}(\mu)$ may be defined as the gradient of $v^\pi(\mu)$ with respect to a fixed parameterization of the policies $\pi$ by parameters $\theta \in \mathbb{E}^d$ that each have a dimensionality d. The kth index of the value function gradient, where $k=1, \ldots, d$, may be denoted by $[\nabla v^{\pi\theta}(\mu)]_k$. $\text{Risk}_t^\pi(s)$ may also be defined for a given reward threshold $t \in \mathbb{R}$ as the probability that the cumulative discounted reward of a trajectory following the policy $\pi$, starting from the state s, is less than the threshold t:

$$\text{Risk}_t^\pi(s) = pr\left(\sum_{i=0}^\infty \gamma^i r(s_i, a_i) < t \,\bigg|\, a_i = \pi(s_i),\, s_0 = s\right)$$

In addition, for a positive integer n, the set $\{1, \ldots, n\}$ may be denoted by $[n]$.

In examples in which the computing device 10 includes QRAM 22, a vector $u \in \mathbb{E}^n$ may be defined, where each entry of u is represented to M bits. u may be an estimate of the value function $v^\pi$ that is iteratively updated as discussed below. In the QRAM 22, the vector u may be represented by a matrix $O_u: \mathbb{C}^n \otimes \mathbb{C}^M \to \mathbb{C}^n \otimes \mathbb{C}^M$ that is defined on basis states by $|i\rangle|0\rangle \to |i\rangle|u_i\rangle$.

In some examples, the quantum coprocessor 20 may be configured to perform quantum amplitude estimation, quantum Monte Carlo mean estimation, or quantum minimum finding. When quantum amplitude estimation is performed, given of O and s', the following state may be prepared by a unitary procedure on the input $|s\rangle|a\rangle$:

$$|s\rangle|a\rangle\left(\sum_{p'} \alpha_{p'}|p'\rangle + \alpha|p_\perp\rangle\right)|\psi_{s,a}\rangle$$

for some state $|\psi_{s,a}\rangle$, where $$|\alpha| := \sqrt{1 - \sum_{p'} |\alpha_{p'}|^2} \leq \delta$$

$$\langle p' | p_\perp \rangle = 0$$

for all p', and $$|p'|p(s'|s,a)| \leq \varepsilon$$

for all p'. The above state may be prepared by making $$O\left(\frac{1}{\varepsilon}\log\frac{1}{\delta}\right)$$

queries to O and $O^\dagger$ (Theorem 1).

Quantum Monte Carlo mean estimation may use a random variable X with variance upper-bounded by $M^2$ and a probability density function encoded in the form of the quantum oracle O with fixed values of s and a. An $\varepsilon$-accurate estimate of $\mathbb{E}[X]$ may then be obtained with a probability of at least $1-\delta$ using $$O\left(\frac{M}{\varepsilon}\log(1/\delta)\right)$$

queries to O (Theorem 2). For example, quantum Monte Carlo mean estimation may be performed using Montanaro's algorithm. In contrast to quantum Monte Carlo mean estimation, classical Monte Carlo mean estimation provides an $\varepsilon$-accurate estimate of $\mathbb{E}[X]$ with a probability of at least $1-\delta$ in $$O\left(\frac{M^2}{\varepsilon^2}\log(1/\delta)\right)$$

samples of the MDP model 30. Thus, quantum Monte Carlo mean estimation using the quantum oracle O provides a quadratic speedup in $M/\varepsilon$.

Montanaro's algorithm for quantum Monte Carlo mean estimation may be implemented with the following steps (algorithm M1). Algorithm M1 may take, as an input, a quantum algorithm A with a variance $\text{Var}(v(A)) \leq \sigma^2$ for a known value of $\sigma^2$. As additional input, algorithm M1 may take an accuracy $\varepsilon$ such that $\varepsilon < 4\sigma$. $v(A)$ is a random variable corresponding the value computed by A. Algorithm M1 may include computing $A' = A/\sigma$, then running A' to obtain an output $\tilde{m}$. A quantum algorithm B may then be defined as an algorithm with steps of running A' and subtracting $\tilde{m}$ from the result. Algorithm M1 may further include approximating the expected values of algorithms $-B_{<0}/4$ and $B_{\geq 0}/4$, with an accuracy of $\varepsilon/(32\sigma)$ and a failure probability of 1/9. The subscripts on B indicate that the algorithms return zero if their output values are outside the respective ranges indicated in the subscripts.

Thus, an approximate expected value $\tilde{\mu}^-$ that estimates $\mathbb{E}[v(-B_{<0})/4]$ and an approximate expected value $\tilde{\mu}^+$ that estimates $\mathbb{E}[v(B_{\geq 0})/4]$ may be computed. Algorithm M1 may further include setting $\tilde{\mu} = \tilde{m} - 4\tilde{\mu}^- + 4\tilde{\mu}^+$ and outputting $\sigma\tilde{\mu}$ as the estimated mean.

When approximating the expected values $\mathbb{E}[v(-B_{<0})/4]$ and $\mathbb{E}[v(B_{\geq 0})/4]$ as part of algorithm M1, the following steps (algorithm M2) may be performed. These steps may be performed to compute an estimated mean output value of a quantum algorithm with a bounded $l_2$ norm. Algorithm M2 may take a quantum algorithm A and an accuracy $\varepsilon < \frac{1}{2}$ as inputs, where $v(A) \geq 0$. Algorithm M2 may include computing the following quantities:

$$k = \lceil \log_2 1/\varepsilon \rceil$$

$$t_0 = \left\lceil \frac{D\sqrt{\log_2 1/\varepsilon}}{\varepsilon} \right\rceil$$

where D is a constant.

Algorithm M2 may further include performing another algorithm M3 to compute an estimate $\tilde{\mu}_0$ of the expected value $\mathbb{E}[v(A_{0,1})]$, where $A_{0,1}$ is a quantum algorithm for which $0 \leq v(A_{0,1}) \leq 1$. Algorithm M1 may take $A_{0,1}$, a positive integer t, and a real number $\delta > 0$ as inputs. In algorithm M3, it may be assumed that $A_{0,1}$ makes no measurements until the end of the algorithm. In addition, $A_{0,1}$ may be assumed to operate on the initial state $|0^n\rangle$ and to include a final measurement of the last $k \leq n$ of these qubits in the computational basis. A unitary operator W on k+1 qubits may be defined as follows:

$$W|x\rangle|0\rangle = |x\rangle(\sqrt{1-\varphi(x)}|0\rangle + \sqrt{\varphi(x)}|1\rangle)$$

where each computational basis state $x \in \{0,1\}^k$ is associated with a real number $\varphi(x) \in [0,1]$ such that $\varphi(x)$ is the value output by $A_{0,1}$ when the measurement outcome x is received. Algorithm M3 may include applying t iterations of amplitude estimation. In each of the iterations, a quantum state given by $$|\psi\rangle = (I \otimes W)(A \otimes I)|0^{n+1}\rangle$$

and a projection operator given by $$P = I \otimes |1\rangle\langle 1|$$

may be used. Algorithm M3 may output the median of the results of the amplitude estimation iterations.

Returning to algorithm M2, after the estimate $\tilde{\mu}_0$ of the expected value $\mathbb{E}[v(A_{0,1})]$ has been computed, algorithm M3 may be further used to generate estimates $\tilde{\mu}_l$ of $\mathbb{E}[v(A_{2^{l-1},2^l})]/2^l$ for $l=1, \ldots, k$. The estimates $\tilde{\mu}_l$ may be computed for $t=t_0$ and $\delta = 1/(10 k)$. The output of the algorithm M2 may be given as follows:

$$\tilde{\mu} = \tilde{\mu}_0 + \sum_{l=1}^{k} 2^l \tilde{\mu}_l$$

Thus, the algorithm M2 may output the estimated mean output value $\tilde{\mu}$ of a quantum algorithm A with a bounded $l_2$ norm.

Returning to the example of FIG. 2B, quantum minimum finding may be performed in examples in which the computing device 10 includes QRAM 22. In quantum minimum finding, a vector $u \in \mathbb{R}^n$ may be represented as a matrix $O_u$ stored in the QRAM 22 as discussed above. Using $O(\sqrt{n}\log(1/\delta))$ applications of the matrix $O_u$ to O, $$\min_i(u_i) \text{ and } \arg\min_i(u_i)$$

may be computed with a probability of at least $1-\delta$ (Theorem 3). Although quantum minimum finding is discussed above, quantum maximum finding may alternatively be performed. In quantum maximum finding, $$\max_i(u_i) \text{ and } \arg\max_i(u_i)$$

may instead be computed with a probability of at least $1-\delta$.

FIG. 3 shows an example algorithm 300 that may be used to compute an estimated optimal Q-function $\hat{q}$ that is within a distance $\varepsilon$ of $q^*$ with a probability of at least $1-\delta$. The example algorithm 200 shown in FIG. 3 may be used in examples in which the computing device 10 includes QRAM 22. The algorithm 200 of FIG. 3 takes u, M, s, a, $\varepsilon$, and $\delta$ as inputs. The vector $u \in \mathbb{R}^S$ that is used as an input is a current estimate of the value function $v^\pi$. u has the property $\|u\mu_\infty \leq M$, where, as discussed above, M is an upper bound on the standard deviation of a probability density function encoded in the quantum oracle O. The vector u may be stored in the QRAM 22. In addition, $\varepsilon, \delta \in (0,1)$ and $\varepsilon < 4M$. Using the quantum oracle O and the vector u stored in the QRAM 22, an oracle $O_{s,a}$ that performs the following mapping is generated at the quantum coprocessor 20:

$$|0\rangle|0\rangle \to \sum_{s'} \sqrt{p(s'|s,a)} |u(s')\rangle|\psi_{s'}\rangle$$

The algorithm 200 outputs an estimate $\hat{y} \in \mathbb{R}$ of the following:

$$y := \mathbb{E}_{s' \sim p(\cdot|s,a)}[u(s')] = p(\cdot|s,a)^\tau u$$

In the above equation, the subscript $s' \sim p(\cdot|s,a)$ indicates that $s'$ is sampled from the probability distribution $p(\cdot|s,a)$.

The estimate $\hat{y}$ satisfies $|\hat{y}-y| \leq \varepsilon$ with a probability of at least $1-\delta$. From the estimate $\hat{y}$, an estimate $\hat{q}$ of $q^*$ may be computed. Computing $\hat{q}$ based on $\hat{y}$ may, for example, include performing sublinear randomized value iteration on $\hat{y}$. Using the algorithm 200, $\hat{y}$ may be computed with $$O\left(\frac{M}{\varepsilon}\log\left(\frac{1}{\delta}\right)\right)$$

queries to O, up to logarithmic factors of the input variables. From the estimate $\hat{y}$, the estimated optimal Q-function $\hat{q}$ may be computed with a number of queries to O having the following complexity, up to logarithmic factors of the input variables:

$$\tilde{O}\left(SA\left(\frac{1}{(1-\gamma)\varepsilon} + \frac{1}{(1-\gamma)^2}\right)\right)$$

(Theorem 4). In contrast, classical estimation of $q^*$ has the following sample complexity:

$$\Theta\left(\frac{SA}{(1-\gamma)\varepsilon^2}\right)$$

Thus, the quantum algorithm for computing $\hat{q}$ may offer a speedup by approximately a factor of $1/\varepsilon$ over classical methods, for values of $\gamma$ and $\varepsilon$ such that $\varepsilon \ll 1-\gamma$.

FIG. 4 shows an example algorithm 300 by which $v^*$ and $\pi^*$ may be estimated in examples in which the computing device 10 includes QRAM 22. The algorithm 300 shown in FIG. 4 takes, as inputs, an initial value $v_0 \in \mathbb{R}^S$, an initial policy $\pi_0 \in A^S$, where $T_{\pi_0}(v_0) \geq v_0$. The algorithm 300 further takes a number of iterations L>0, the target accuracy $\varepsilon \in (0,1)$, and the failure probability $\delta \in (0,1)$ as inputs. The QRAM 22 stores the rewards r(s,a), the initial value $v_0$, and a previous value $v_{l-1}$ for the iteration before the current iteration $l \in [L]$. During each iteration l, for each state s, the quantum coprocessor 20 forms a first oracle $O_s''$, applied quantum Monte Carlo mean estimation twice, forms a second oracle $O_s'$, forms a third oracle $O_s$, and performs quantum minimum finding on $O_s$. Performing quantum minimum finding on $O_s$ outputs $v(s)$ and $\pi(s)$. When $v(s)-\gamma\varepsilon>v_{l-1}(s)$, the quantum coprocessor 20 updates $v_{l-1}(s)$ to $v(s)$ in the QRAM 22, and further updates $\pi_{l-1}(s)$ to $\pi(s)$.

The algorithm 300 outputs $v_L \in \mathbb{R}^S$, the value after L iterations, and $\pi_L \in A^S$, the policy after L iterations, as the estimated optimal value $\hat{v}$ and the estimated optimal policy $\hat{\pi}$ respectively. The algorithm 300 has the following query complexity, up to logarithmic factors of the input variables:

$$\tilde{O}\left(\frac{s\sqrt{A}}{(1-\gamma)^2 \varepsilon}\right)$$

(Theorem 5). The classical sample complexity of estimating $v^*$ and $\pi^*$ is $$\Theta\left(\frac{SA}{(1-\gamma)\varepsilon^2}\right)$$

Thus, the algorithm 300 provides a quadratic speedup in both A and $1/\varepsilon$ compared to classical alternatives.

Figure 5A:
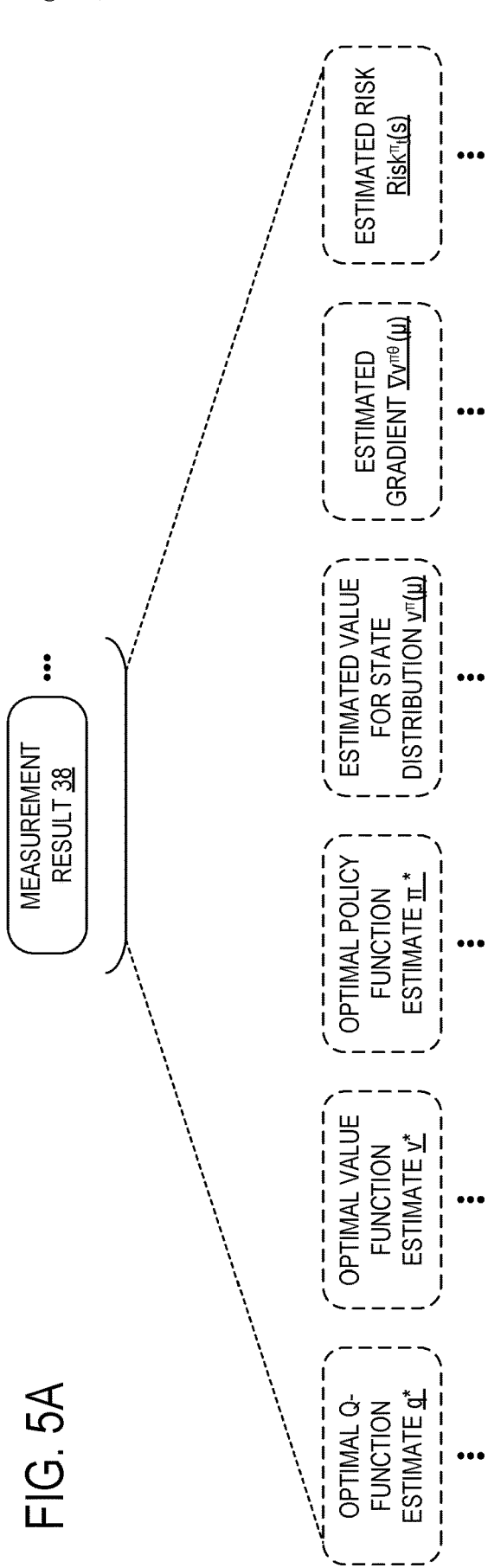
FIG. 5A shows examples of a measurement result received from a quantum oracle, according to the embodiment of FIG. 2A or 2B.

FIG. 5A summarizes the quantities that may be received from the quantum oracle 40 as the measurements results 38. In addition to $q^*$, $v^*$, and $\pi^*$, the quantities $v^\pi(\mu)$, $[\nabla v^{\pi\theta}(\mu)]_k$, and $\text{Risk}_t^\pi(s)$ as defined above may also be estimated at the quantum coprocessor 20. $v^\pi(\mu)$, $[\nabla v^{\pi\theta}(\mu)]_k$, and $\text{Risk}_t^\pi(s)$ may be computed at the quantum coprocessor 20 even in examples in which the computing device 10 does not include QRAM 22. Computing each of $v^\pi(\mu)$, $[\nabla v^{\pi\theta}(\mu)]_k$, and $\text{Risk}_t^\pi(s)$ may include a quantum-mechanical version of a rollout step (quantum rollout) in which O is queried $O(1/(1-\gamma))$ times. Here rollout implies that from a given starting state the MDP repeatedly evolves to a new state $O(1/(1-\gamma))$ times as per its transition matrix while the agent chooses its action per the policy $\pi$ at each state. In the quantum rollout, this evolution is carried out coherently with the use of superposition queries to O. In examples in which $v^\pi(\mu)$ is computed, the quantum coprocessor 20 may be configured to compute $v^\pi(\mu)$ by quantum Monte Carlo mean estimation subsequently to the quantum rollout step. The quantum coprocessor 20 may be configured to compute $[\nabla v^{\pi\theta}(\mu)]_k$ by expressing $\nabla v^{\pi\theta}(\mu)$ according to the policy gradient theorem and applying quantum Monte Carlo mean estimation to it after the quantum rollout step. $\nabla v^{\pi\theta}(\mu)$ may be expressed according to the policy gradient theorem as follows:

$$\nabla v^{\pi\theta}(\mu) = E_{\tau \sim Pr_\mu^{\pi\theta}}\left[R(\tau)\sum_{r=0}^{\infty} \nabla \log \pi_\theta(a_t|s_t)\right] =$$

$$\frac{1}{1-\gamma}E_{s\sim d^{\pi\theta}}E_{a\sim\pi_\theta(\cdot|S)}[q^{\pi\theta}(s,a)\nabla \log\pi_\theta(s,a)] =$$

$$\frac{1}{1-\gamma}E_{s\sim d^{\pi\theta}}E_{a\sim\pi_\theta(\cdot|S)}[A^{\pi\theta}(s,a)\nabla \log\pi_\theta(s,a)]$$

In the above equation, $R(\tau)$ is defined as follows:

$$R(\tau) := (1-\gamma)\sum_{t=0}^{\infty}\gamma^t r(s_t, a_t)$$

where $s_t, a_t$ are the state-action pairs for a trajectory $\tau$. In addition, in the above equation for the policy value theorem, $A^{\pi\theta}(s,a)$ is the advantage of the policy $\pi_\theta$. The advantage is defined as follows:

$$A^\pi(s,a) := q^\pi(s,a) - v^\pi(s)$$

In addition, $d^{\pi\theta}$ as used in the policy value theorem is the dimension of the parameter space. $Pr_\mu^\pi(\tau)$ is an unconditional probability distribution for the trajectory $\tau$ under the policy $\pi$ with the starting distribution $\mu$, and is given by the following:

$$Pr_\mu^\pi(\tau) = \mu(s_0)\pi(a_0|s_0)p(s_1|s_0,a_0)\pi(a_1|s_1)$$

When $\text{Risk}_t^\pi(s)$ is computed, the processor 12 may be configured to apply a threshold function to the MDP model 30 that marks trajectories with a cumulative discounted reward of less than t. Quantum amplitude estimation may then be applied to the MDP model 30 with the threshold function applied.

Computation of $v^\pi(\mu)$, $[\nabla v^{\pi\theta}(\mu)]_k$, and $\text{Risk}_t^\pi(s)$ using classical algorithms may each have a sample complexity of $$\Theta\left(\frac{1}{(1-\gamma)\varepsilon^2}\right)$$

whereas computation $v_\pi(\mu)$, $[\nabla v^{\pi\theta}(\mu)]_k$, and $\text{Risk}_t^\pi(s)$ at least in part using a quantum coprocessor 20 according to the processes discussed above may have a query complexity of $$\Theta\left(\frac{1}{(1-\gamma)\varepsilon}\right)$$

Thus, performing quantum Monte Carlo mean estimation or quantum amplitude estimation when computing any of the above quantities may reduce the sample complexity by a factor of $1/\varepsilon$.

FIG. 5B shows a table 310 summarizing the classical sample complexities and quantum query complexities of estimating each of the quantities $q^*$, $v^*$, $\pi^*$, $v^\pi(\mu)$, $[\nabla v^{\pi\theta}(\mu)]_k$, and $\text{Risk}_t^\pi(s)$ shown in FIG. 5A. FIG. 5B shows, for each of the above quantities, the upper bound and lower bound for estimating that quantity with an error of $\varepsilon/(1-\gamma)$ or lower. "Matching" in the lower bound columns indicates that the lower bound complexity for that quantity matches the upper bound complexity.

The value $v^{\pi_u}$ of a policy $\pi_u$ induced by a function $u: S \to \mathbb{R}$ may be less optimal than the function u in terms of its $l_\infty$-norm distance from $v^*$. However, this loss of optimality is at most by a factor of $2\gamma/(1-\gamma)$:

$$\|v^{\pi_u} - v^*\|_\infty \leq \frac{2\gamma}{(1-\gamma)}\|u - v^*\|_\infty$$

Figure 6:
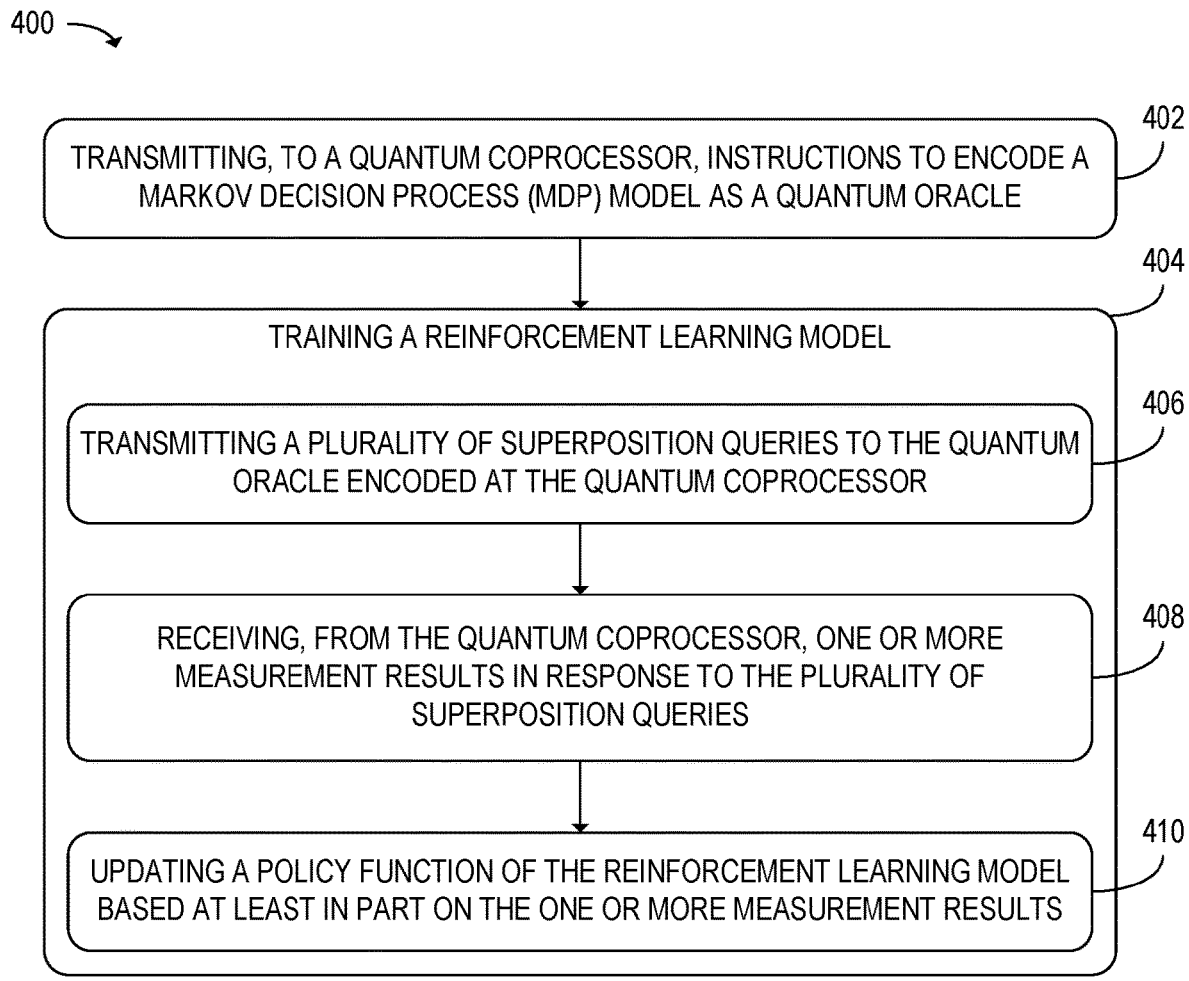
FIG. 6 shows a flowchart of an example method for use with a computing device to train a reinforcement learning model, according to the embodiment of FIG. 2A.

FIG. 6 shows a flowchart of an example method 400 that may be used with a computing device including a quantum coprocessor. The method 400 of FIG. 6 may be performed at the computing device 10 of FIG. 2A or at some other computing device. At step 402, the method 400 may include transmitting, to the quantum coprocessor, instructions to encode an MDP model as a quantum oracle. The instructions may be transmitted to the quantum coprocessor from a classical processor. The MDP model may include a plurality of states and a plurality of actions. The MDP model may further include a plurality of rewards respectively associated with the states. In addition, for each action, the MDP model may further include one or more transition probabilities that respectively indicate probabilities that an agent transitions to one or more corresponding states when the action is taken. The MDP model may further include a discount factor that may be used as a base for exponential discounting of the rewards.

At step 404, the method 400 may further include training a reinforcement learning model. The reinforcement learning model may be trained at the classical processor. Training the reinforcement learning model at step 404 may include, at step 406, transmitting a plurality of superposition queries to the quantum oracle encoded at the quantum coprocessor. Each superposition query may be an instruction to perform a sampling operation at the quantum oracle. At step 408, step 404 may further include receiving one or more measurement results from the quantum coprocessor in response to the plurality of superposition queries. At step 410, step 404 may further include updating a policy function of the reinforcement learning model based at least in part on the one or more measurement results. The policy function may be updated via Q-learning, approximate value iteration, or some other RL model training technique.

In some examples, the one or more measurement results received at step 408 may include, for the policy function of the reinforcement learning model, an estimated value of a state distribution. Additionally or alternatively, the one or more measurement results may include an estimated gradient of the estimated value of the state distribution, or an estimated risk of obtaining a cumulative discounted reward below a reward threshold.

In some examples, the computing device at which the method 400 is performed may further include QRAM. In such examples, the one or more measurement results may include an estimated optimal Q-function, an estimated optimal value function, or an estimated optimal policy function for the reinforcement learning model. The estimated optimal Q-function, the estimated optimal value function, or the estimated optimal policy function may be computed at the quantum coprocessor at least in part by making one or more memory calls to the QRAM. The estimated optimal Q-function, the estimated optimal value function, or the estimated optimal policy function may be computed at the quantum coprocessor via quantum amplitude estimation, quantum Monte Carlo mean estimation, or quantum minimum finding.

Figure 7:
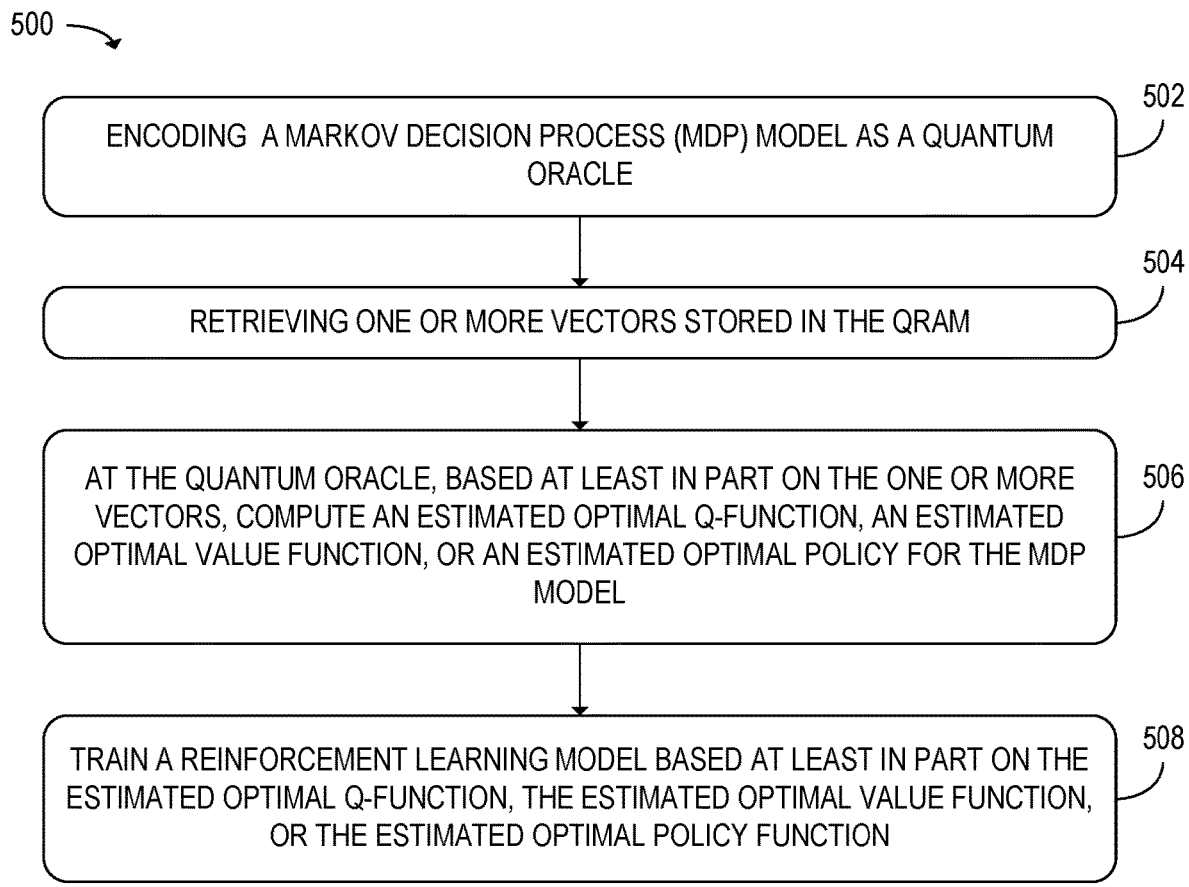
FIG. 7 shows a flowchart of an example method for use with a quantum computing device to train a reinforcement learning model, according to the embodiment of FIG. 2B.

FIG. 7 shows a flowchart of an example method 500 that may be performed at a quantum computing device. The quantum computing device at which the method 500 is performed may be a general-purpose quantum computing device including a quantum processor and QRAM. At step 502, the method 500 may include encoding an MDP model as a quantum oracle. At step 504, the method 500 may further include retrieving one or more vectors stored in the QRAM. The one or more vectors stored in the QRAM may include a reward vector of rewards included in the MDP model. Additionally or alternatively, the one or more vectors stored in the QRAM may include a value function vector of respective values corresponding to states included in the MDP model. The value function vector may be a vector of corresponding rewards expected for the states of the MDP model when the agent follows a particular policy.

At step 506, the method 500 may further include, at the quantum oracle, computing an estimated optimal Q-function, an estimated optimal value function, or an estimated optimal policy for the MDP model. The estimated optimal Q-function, estimated optimal value function, or estimated optimal policy may be computed based at least in part on the one or more vectors retrieved from the QRAM. In some examples, one or more additional quantum oracles may be computed using the one or more vectors retrieved from the QRAM and may be queried to obtain the estimated optimal Q-function, estimated optimal value function, or estimated optimal policy. The estimated optimal Q-function, the estimated optimal value function, or the estimated optimal policy function via quantum amplitude estimation, quantum Monte Carlo mean estimation, or quantum minimum finding.

At step 508, the method 500 may further include training a reinforcement learning model based at least in part on the estimated optimal Q-function, the estimated optimal value function, or the estimated optimal policy function. The reinforcement learning model may be trained at the quantum processor via Q-learning or approximate value iteration.

Figure 8:
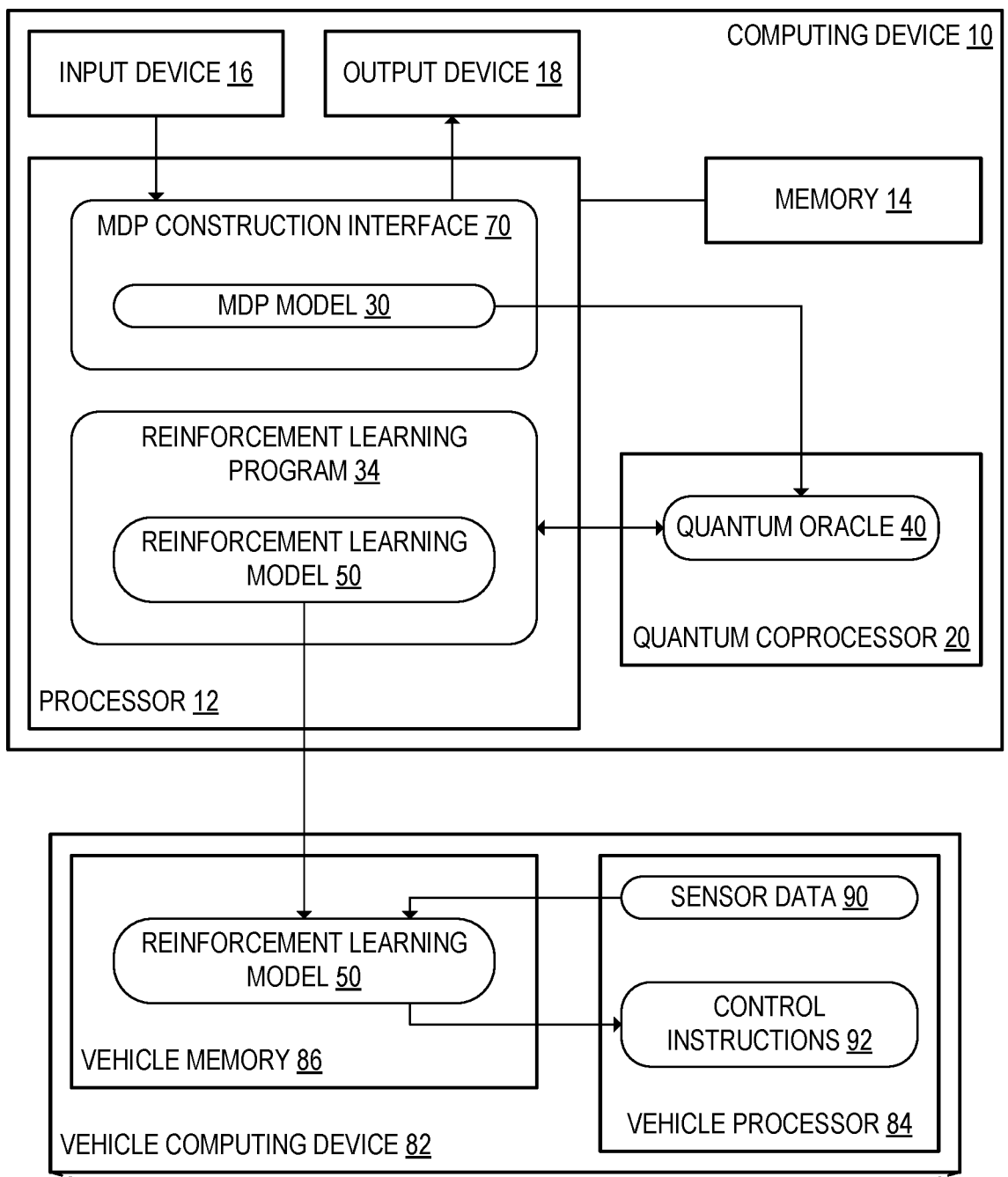
FIG. 8 schematically shows the example computing device of FIG. 2A when a reinforcement learning model configured to control an autonomous vehicle is generated.

FIG. 8 shows an example use case scenario in which the devices and methods discussed above are used to train a reinforcement learning model 50 for use in an autonomous vehicle 80. In the example of FIG. 8, the processor 12 of the computing device 10 is configured to implement an MDP construction interface 70 at which a user may construct the MDP model 30. The user may interact with the MDP construction interface 70 via one or more input devices 16 and one or more output devices 18 included in the computing device 10. For example, the MDP construction interface 70 may be a graphical user interface (GUI) that is displayed on a display included in the computing device 10. When the user constructs the MDP model 30 at the MDP construction interface 70, the user may specify the plurality of actions, the plurality of states, the plurality of rewards, the plurality of transition probabilities, and the discount factor for the MDP model 30. In some examples, the MDP construction interface 70 may be configured to programmatically construct at least a portion of the MDP model 30. The MDP model 30 in the example of FIG. 8 may describe the environment in which the autonomous vehicle 80 may be operated, the navigation actions that may be performed at the autonomous vehicle 80 to move through that environment, and the extent to which different potential states of the autonomous vehicle 80 and the environment are desirable or undesirable.

Subsequently to the generation of the MDP model 30, the MDP model 30 may be encoded as a quantum oracle 40 at the quantum coprocessor 20, and the reinforcement learning model 50 may be trained at the reinforcement learning program 34 as discussed above. The processor 12 may be further configured to transmit the trained reinforcement learning model 50 to a vehicle computing device 82 included in the autonomous vehicle 80. The reinforcement learning model 50 may be stored in vehicle memory 86 of the vehicle computing device 82.

When the autonomous vehicle 80 is operated, a vehicle processor 84 included in the vehicle computing device 82 may be configured to communicate with the vehicle memory 86 to execute the reinforcement learning model 50. The vehicle processor 84 may be configured to receive sensor data 90 from one or more sensors included in the autonomous vehicle 80. The vehicle processor 84 may be further configured to input the sensor data 90 into the reinforcement learning model 50, which may generate control instructions 92 for one or more actuators (e.g. electric motors) included in the autonomous vehicle 80. Thus, the reinforcement learning model 50 may be used to control navigation of the autonomous vehicle 80.

When a reinforcement learning model 50 for controlling an autonomous vehicle 80 is generated as discussed above, the savings in computing time that may be achieved by utilizing the quantum coprocessor 20 may allow an MDP model 30 with a larger action space to be feasibly used. Control of the autonomous vehicle 80 may therefore be modeled in greater detail at the MDP construction interface 70, thereby allowing the MDP model 30 to more accurately reflect physical navigation of the autonomous vehicle through its surrounding environment. In addition, the devices and methods discussed above may make lower values of $\varepsilon$ practical to use when training the reinforcement learning model, thereby resulting in a reinforcement learning model with a policy that is closer to the optimal policy.

The quantum oracle 40 may, in some examples, be used to explore policies for a reinforcement learning model that would be expensive or dangerous to test in a real-world environment. In the example of the autonomous vehicle 80, the quantum oracle 40 may simulate policies that would result in the autonomous vehicle 80 colliding with objects if implemented in a physical environment. The reinforcement learning model 50 may accordingly be trained to avoid such states without having to be trained on physical vehicles. After having been trained to avoid highly undesirable states or policies, the reinforcement learning model 50 may be further trained in the physical environment to fine-tune the policy. Use of the quantum oracle 40 during early stages of training may therefore allow the computing device 10 to engage in safe exploration while training the reinforcement learning model 50.

In addition to autonomous vehicle navigation, the devices and methods discussed above may also be used in other reinforcement learning settings. For example, the devices and methods discussed above may be used when training a computer-controlled video game character. As a result of the speedup in A discussed above, the above devices and methods may allow reinforcement learning models 50 to be trained to play video games with larger action spaces than would previously have been feasible. As another example, the devices and methods discussed above may be used in a manufacturing setting to train a reinforcement learning model 50 to control an industrial robot. More speculatively, the systems and methods discussed above may potentially be useful when training an artificial general intelligence. For example, the artificial general intelligence may be trained on an MDP model 30 of a real-world environment, represented at the quantum oracle 40, prior to training in a real-world environment, such that the artificial general intelligence may be trained to avoid policies with highly negative outcomes prior to real-world deployment. The artificial general intelligence may then be further trained based on interactions with the real-world environment within a smaller space of policies that are more likely to be safe.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
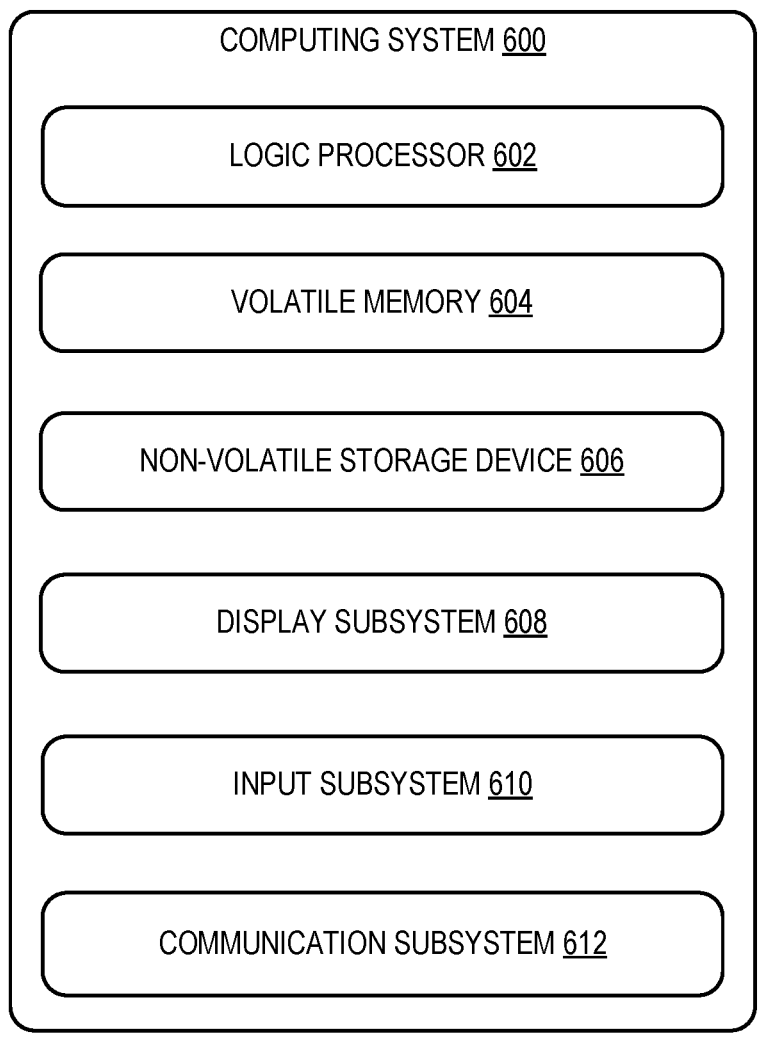
FIG. 9 shows a schematic view of an example computing environment in which the computing device of FIG. 2A or the quantum computing device of FIG. 2B may be enacted.

FIG. 9 schematically shows a non-limiting embodiment of a computing system 600 that can enact one or more of the methods and processes described above. Computing system 600 is shown in simplified form. Computing system 600 may embody the computing device 10 described above and illustrated in FIG. 2A or the quantum computing device 100 described above and illustrated in FIG. 2B. Components of the computing system 600 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 9.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs discuss several aspects of the present disclosure. According to one aspect of the present disclosure, a computing device is provided, including a processor configured to transmit, to a quantum coprocessor, instructions to encode a Markov decision process (MDP) model as a quantum oracle. The processor may be further configured to train a reinforcement learning model at least in part by transmitting a plurality of superposition queries to the quantum oracle encoded at the quantum coprocessor. The processor may be further configured to train the reinforcement learning model at least in part by receiving, from the quantum coprocessor, one or more measurement results in response to the plurality of superposition queries. The processor may be further configured to train the reinforcement learning model at least in part by updating a policy function of the reinforcement learning model based at least in part on the one or more measurement results.

According to this aspect, the one or more measurement results may include an estimated optimal Q-function, an estimated optimal value function, or an estimated optimal policy function for the reinforcement learning model.

According to this aspect, the computing device may further include quantum random access memory (QRAM). The quantum coprocessor may be configured to compute the estimated optimal Q-function, the estimated optimal value function, or the estimated optimal policy function at least in part by making one or more memory calls to the QRAM.

According to this aspect, the estimated optimal Q-function, the estimated optimal value function, or the estimated optimal policy function may be computed at the quantum coprocessor via quantum amplitude estimation, quantum Monte Carlo mean estimation, or quantum minimum finding.

According to this aspect, the one or more measurement results may include the estimated optimal Q-function. The plurality of superposition queries may include a number of superposition queries proportional to a number of actions included in the MDP model.

According to this aspect, the one or more measurement results may include the estimated optimal value function or the estimated optimal policy function. The plurality of superposition queries may include a number of superposition queries proportional to a square root of a number of actions included in the MDP model.

According to this aspect, the processor may be configured to train the reinforcement learning model via Q-learning or approximate value iteration.

According to this aspect, the one or more measurement results may include, for the policy function of the reinforcement learning model, an estimated value for a state distribution, an estimated gradient of the estimated value for the state distribution, or an estimated risk of obtaining a cumulative discounted reward below a reward threshold.

According to this aspect, the plurality of superposition queries may include a number of superposition queries proportional to an inverse of a predefined maximum distance between an optimal value estimate included in the one or more measurement results and an optimal value approximated by the optimal value estimate.

According to another aspect of the present disclosure, a method for use with a computing device is provided. The method may include transmitting, to a quantum coprocessor, instructions to encode a Markov decision process (MDP) model as a quantum oracle. The method may further include training a reinforcement learning model at least in part by transmitting a plurality of superposition queries to the quantum oracle encoded at the quantum coprocessor. Training the reinforcement learning model may further include receiving, from the quantum coprocessor, one or more measurement results in response to the plurality of superposition queries. Training the reinforcement learning model may further include updating a policy function of the reinforcement learning model based at least in part on the one or more measurement results.

According to this aspect, the one or more measurement results may include an estimated optimal Q-function, an estimated optimal value function, or an estimated optimal policy function for the reinforcement learning model.

According to this aspect, the estimated optimal Q-function, the estimated optimal value function, or the estimated optimal policy function may be computed at the quantum coprocessor at least in part by making one or more memory calls to quantum random access memory (QRAM).

According to this aspect, the estimated optimal Q-function, the estimated optimal value function, or the estimated optimal policy function may be computed at the quantum coprocessor via quantum amplitude estimation, quantum Monte Carlo mean estimation, or quantum minimum finding.

According to this aspect, the reinforcement learning model may be trained via Q-learning or approximate value iteration.

According to this aspect, the one or more measurement results may include, for the policy function of the reinforcement learning model, an estimated value of a state distribution, an estimated gradient of the estimated value of the state distribution, or an estimated risk of obtaining a cumulative discounted reward below a reward threshold.

According to another aspect of the present disclosure, a quantum computing device is provided. The quantum computing device may include quantum random access memory (QRAM). The quantum computing device may further include a quantum processor configured to encode a Markov decision process (MDP) model as a quantum oracle. The quantum processor may be further configured to retrieve one or more vectors stored in the QRAM. At the quantum oracle, based at least in part on the one or more vectors, the quantum processor may be further configured to compute an estimated optimal Q-function, an estimated optimal value function, or an estimated optimal policy for the MDP model. The quantum processor may be further configured to train a reinforcement learning model based at least in part on the estimated optimal Q-function, the estimated optimal value function, or the estimated optimal policy function.

According to this aspect, the one or more vectors stored in the QRAM may include a reward vector of rewards included in the MDP model.

According to this aspect, the one or more vectors stored in the QRAM include a value function vector of respective values corresponding to states included in the MDP model.

According to this aspect, the quantum processor may be configured to compute the estimated optimal Q-function, the estimated optimal value function, or the estimated optimal policy function via quantum amplitude estimation, quantum Monte Carlo mean estimation, or quantum minimum finding.

According to this aspect, the quantum processor may be configured to train the reinforcement learning model via Q-learning or approximate value iteration.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
transmit, to a quantum coprocessor, instructions to encode a Markov decision process (MDP) model as a quantum oracle; and
train a reinforcement learning model at least in part by:
transmitting a plurality of superposition queries to the quantum oracle encoded at the quantum coprocessor, wherein:
a number of the superposition queries is proportional to an inverse of a target accuracy; and
the target accuracy is a predefined maximum distance between an optimal value estimate included in one or more measurement results and an optimal value approximated by the optimal value estimate;
performing one or more measurements at the quantum oracle as specified by the superposition queries;
receiving, from the quantum coprocessor, one or more measurement results of the one or more measurements in response to the plurality of superposition queries; and
updating a policy function of the reinforcement learning model based at least in part on the one or more measurement results.

2. The computing device of claim 1, wherein the one or more measurement results include an estimated optimal Q-function, an estimated optimal value function, or an estimated optimal policy function for the reinforcement learning model.

3. The computing device of claim 2, further comprising quantum random access memory (QRAM), wherein the quantum coprocessor is configured to compute the estimated optimal Q-function, the estimated optimal value function, or the estimated optimal policy function at least in part by making one or more memory calls to the QRAM.

4. The computing device of claim 2, wherein the estimated optimal Q-function, the estimated optimal value function, or the estimated optimal policy function is computed at the quantum coprocessor via quantum amplitude estimation, quantum Monte Carlo mean estimation, or quantum minimum finding.

5. The computing device of claim 2, wherein:
the one or more measurement results include the estimated optimal Q-function; and
the plurality of superposition queries includes a number of superposition queries proportional to a number of actions included in the MDP model.

6. The computing device of claim 2, wherein:
the one or more measurement results include the estimated optimal value function or the estimated optimal policy function; and the plurality of superposition queries includes a number of superposition queries proportional to a square root of a number of actions included in the MDP model.

7. The computing device of claim 1, wherein the processor is configured to train the reinforcement learning model via Q-learning or approximate value iteration.

8. The computing device of claim 1, wherein the one or more measurement results include, for the policy function of the reinforcement learning model:
an estimated value of a state distribution;
an estimated gradient of the estimated value of the state distribution; or
an estimated risk of obtaining a cumulative discounted reward below a reward threshold.

9. A method for use with a computing device, the method comprising:
transmitting, to a quantum coprocessor, instructions to encode a Markov decision process (MDP) model as a quantum oracle; and
training a reinforcement learning model at least in part by:
transmitting a plurality of superposition queries to the quantum oracle encoded at the quantum coprocessor, wherein:
a number of the superposition queries is proportional to an inverse of a target accuracy; and
the target accuracy is a predefined maximum distance between an optimal value estimate included in one or more measurement results and an optimal value approximated by the optimal value estimate;
performing one or more measurements at the quantum oracle as specified by the superposition queries;
receiving, from the quantum coprocessor, one or more measurement results of the one or more measurements in response to the plurality of superposition queries; and
updating a policy function of the reinforcement learning model based at least in part on the one or more measurement results.

10. The method of claim 9, wherein the one or more measurement results include an estimated optimal Q-function, an estimated optimal value function, or an estimated optimal policy function for the reinforcement learning model.

11. The method of claim 10, wherein the estimated optimal Q-function, the estimated optimal value function, or the estimated optimal policy function is computed at the quantum coprocessor at least in part by making one or more memory calls to quantum random access memory (QRAM).

12. The method of claim 10, wherein the estimated optimal Q-function, the estimated optimal value function, or the estimated optimal policy function is computed at the quantum coprocessor via quantum amplitude estimation, quantum Monte Carlo mean estimation, or quantum minimum finding.

13. The method of claim 9, wherein the reinforcement learning model is trained via Q-learning or approximate value iteration.

14. The method of claim 9, wherein the one or more measurement results include, for the policy function of the reinforcement learning model:
an estimated value of a state distribution;
an estimated gradient of the estimated value of the state distribution; or
an estimated risk of obtaining a cumulative discounted reward below a reward threshold.

15. A quantum computing device comprising:
quantum random access memory (QRAM); and
a quantum processor configured to:
encode a Markov decision process (MDP) model as a quantum oracle, wherein the quantum oracle is a quantum analogue of the MDP model;
retrieve one or more vectors stored in the QRAM;
receive a plurality of superposition queries from a classical computing device, wherein:
a number of the superposition queries is proportional to an inverse of a target accuracy; and
the target accuracy is a predefined maximum distance between an optimal value estimate included in one or more measurement results and an optimal value approximated by the optimal value estimate;
at the quantum oracle, based at least in part on the one or more vectors and the plurality of superposition queries, compute an estimated optimal Q-function, an estimated optimal value function, or an estimated optimal policy for the MDP model; and
perform, by the classical computing device, one or more measurements at the quantum oracle to receive the estimated optimal Q-function, the estimated optimal value function, or the estimated optimal policy function,
wherein the classical computing device is configured to train a reinforcement learning model based at least in part on the estimated optimal Q-function, the estimated optimal value function, or the estimated optimal policy function.

16. The quantum computing device of claim 15, wherein the one or more vectors stored in the QRAM include a reward vector of rewards included in the MDP model.

17. The quantum computing device of claim 15, wherein the one or more vectors stored in the QRAM include a value function vector of respective values corresponding to states included in the MDP model.

18. The quantum computing device of claim 15, wherein the quantum processor is configured to compute the estimated optimal Q-function, the estimated optimal value function, or the estimated optimal policy function via quantum amplitude estimation, quantum Monte Carlo mean estimation, or quantum minimum finding.

19. The quantum computing device of claim 15, wherein the classical computing device is configured to train the reinforcement learning model via Q-learning or approximate value iteration.

* * * * *